US012750598B2

(12) United States Patent
Shimazu

(10) Patent No.: US 12,750,598 B2
(45) Date of Patent: Sep. 29, 2026

(54) EVENT-BASED SENSOR SIGNAL MANAGEMENT

(71) Applicant: Sony Interactive Entertainment Inc., Tokyo (JP)

(72) Inventor: Takashi Shimazu, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 62 days.

(21) Appl. No.: 18/846,876

(22) PCT Filed: Mar. 22, 2022

(86) PCT No.: PCT/JP2022/012944
§ 371 (c)(1),
(2) Date: Sep. 13, 2024

(87) PCT Pub. No.: WO2023/181092
PCT Pub. Date: Sep. 28, 2023

(65) Prior Publication Data
US 2025/0310656 A1 Oct. 2, 2025

(51) Int. Cl.
*H04N 25/47* (2023.01)
*G06F 3/01* (2006.01)

(52) U.S. Cl.
CPC .................................. *H04N 25/47* (2023.01)

(58) Field of Classification Search
CPC .................................. H04N 25/47; G06F 3/01
See application file for complete search history.

(56) References Cited

U.S. PATENT DOCUMENTS

| | | | | |
|---|---|---|---|---|
| 11,532,143 | B2 * | 12/2022 | Seo | G06F 18/243 |
| 2016/0109955 | A1 * | 4/2016 | Park | G06F 3/011 345/668 |
| 2021/0136288 | A1 | 5/2021 | Stec | |

FOREIGN PATENT DOCUMENTS

| | | | |
|---|---|---|---|
| JP | 2014-535098 | A | 12/2014 |
| JP | 2018-022490 | A | 2/2018 |
| JP | 2018-085725 | A | 5/2018 |
| WO | 2020/263230 | A1 | 12/2020 |

OTHER PUBLICATIONS

International Search Report and Written Opinion mailed on Jun. 21, 2022, received for International Application No. PCT/JP2022/012944, filed on Mar. 22, 2022, 8 pages including English Translation.

* cited by examiner

*Primary Examiner* — Ahmed A Berhan
(74) *Attorney, Agent, or Firm* — Kilpatrick Townsend & Stockton LLP

(57) ABSTRACT

Provided is an electronic device including an event-based vision sensor, a physical input/output unit, and a control unit configured to set a predetermined flag to an event signal generated by the event-based vision sensor during operation of the input/output unit.

20 Claims, 4 Drawing Sheets

EVENT-BASED SENSOR SIGNAL MANAGEMENT

CROSS-REFERENCE TO RELATED APPLICATION

The present application is a national stage application, pursuant to 35 U.S.C. § 371, of International Patent Application No. PCT/JP2022/012944, filed Mar. 22, 2022, the entire disclosure of which is hereby incorporated by reference herein.

TECHNICAL FIELD

The present invention relates to an electronic device, and a control method and a program for the electronic device.

BACKGROUND ART

There have been known event-based vision sensors in which the pixels that have detected intensity changes in incident light generate signals asynchronously in time. Event-based vision sensors have advantages over frame-based vision sensors configured to scan all the pixels at predetermined intervals, specifically, image sensors such as CCDs and CMOSs, in that they can operate at low power and high speed and can have both high temporal resolution and high spatial resolution. Technologies regarding such event-based vision sensors are described in PTL 1 and PTL 2, for example.

CITATION LIST

Patent Literature

[PTL 1]
National Publication of International Patent Application No. 2014-535098
[PTL 2]
Japanese Patent Laid-Open No. 2018-85725

SUMMARY

Technical Problem

However, regarding the event-based vision sensor, while the advantages as described above have been known, it is still hard to say that peripheral technologies considering an operation of an event-based vision sensor in a case where the event-based vision sensor is implemented together with other devices in electronic devices have been sufficiently proposed.

Thus, it is an object of the present invention to provide an electronic device and a control method and a program for the electronic device, which are capable of achieving an effective operation in a case where an event-based vision sensor is implemented together with other devices.

Solution to Problem

According to a certain aspect of the present invention, there is provided an electronic device including an event-based vision sensor, a physical input/output unit, and a control unit configured to set a predetermined flag to an event signal generated by the event-based vision sensor during operation of the input/output unit.

According to another aspect of the present invention, there is provided a control method for an electronic device including an event-based vision sensor and a physical input/output unit, the control method including a step of setting a predetermined flag to an event signal generated by the event-based vision sensor during operation of the input/output unit.

According to still another aspect of the present invention, there is provided a control program for an electronic device including an event-based vision sensor and a physical input/output unit, the control program causing a computer to achieve a function of setting a predetermined flag to an event signal generated by the event-based vision sensor during operation of the input/output unit.

DESCRIPTION OF EMBODIMENTS

Now, some embodiments of the present invention are described in detail with reference to the accompanying drawings. Note that, in the present specification and drawings, components having substantially the same functional configurations are denoted by the same reference signs to omit redundant descriptions.

Figure 1:
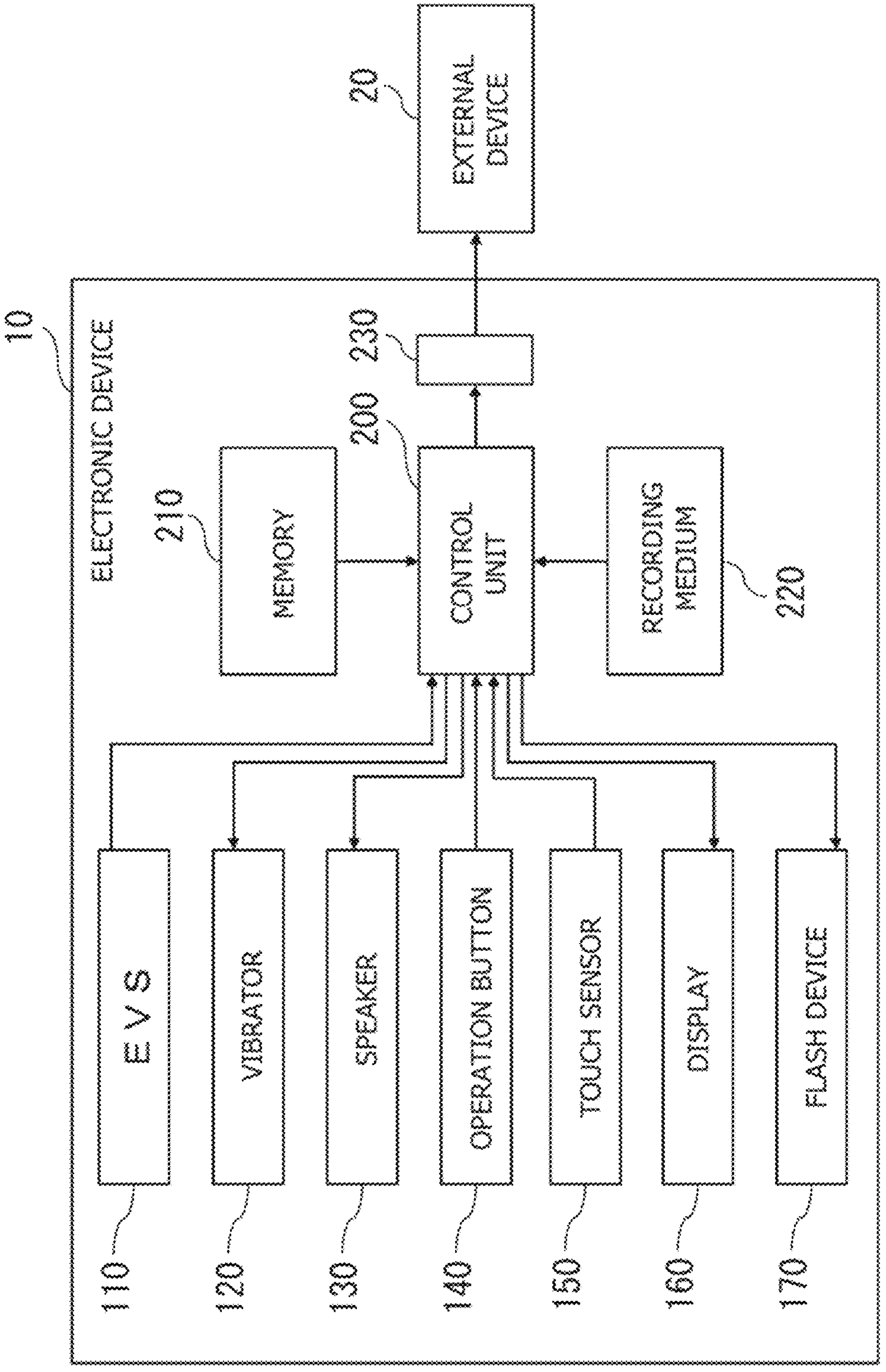
FIG. 1 is a diagram schematically illustrating a configuration of an electronic device according to one embodiment of the present invention.

FIG. 1 is a diagram schematically illustrating a configuration of an electronic device according to one embodiment of the present invention. In the example illustrated in FIG. 1, an electronic device 10 includes an EVS (Event-based Vision Sensor) 110, a vibrator 120, a speaker 130, an operation button 140, a touch sensor 150, a display 160, a flash device 170, a control unit 200, a memory 210, a recording medium 220, and a communication device 230. The electronic device 10 according to the present embodiment may be, for example, a smartphone, a tablet terminal, or a portable game console. Note that the electronic device 10 may not necessarily include all the vibrator 120, the speaker 130, the operation button 140, the touch sensor 150, the display 160, and the flash device 170, and may include only some of these. The touch sensor 150 and the display 160 may be integrally implemented as a touch panel, for example. Further, physical input/output units not limited to the examples described above may be included in the electronic device 10.

The EVS 110 is also called EDS (Event Driven Sensor), event camera, or DVS (Dynamic Vision Sensor) and includes a sensor array including sensors including light-receiving elements. When the EVS 110 detects intensity changes in incident light, more specifically, luminance changes on an object surface, by the sensors, the EVS 110 generates an event signal including a timestamp, sensor identification information, and polarity information regarding the luminance changes. The event signal generated by the EVS 110 is input to the control unit 200. The control unit 200 temporarily or continuously stores the event signal in the memory 210 or the recording medium 220 or transfers the event signal to an external device 20 through the communication device 230. In the present embodiment, the vibrator 120, the speaker 130, the operation button 140, the touch sensor 150, the display 160, and the flash device 170 also operate or transmit input signals to the control unit 200, under the control of the control unit 200. Thus, each operation timing of these devices is known in the control unit 200.

The control unit 200 includes processing circuits such as a CPU (Central Processing Unit), a DSP (Digital Signal Processor), an ASIC (Application Specific Integrated Circuit), and/or an FPGA (Field-Programmable Gate Array). The memory 210 includes various types of storage devices such as a ROM (Read Only Memory), a RAM (Random Access Memory), and/or an HDD (Hard Disk Drive). The control unit 200 executes operations as described below in accordance with the program codes stored in the memory 210. The program codes may be loaded from the recording medium 220 to the memory 210 or received from the external device 20 through the communication device 230 and stored in the memory 210. The recording medium 220 includes a removable recording medium such as a semiconductor memory, a magnetic disk, an optical disc, or a magneto-optical disk, and its driver. The communication device 230 includes various wired or wireless communication interfaces.

In the present embodiment, the vibrator 120, the speaker 130, the operation button 140, the touch sensor 150, the display 160, and the flash device 170 included in the electronic device 10 are examples of physical input/output units. More specifically, the vibrator 120 and the speaker 130 are devices configured to generate mechanical output, which is vibration. The operation button 140 and the touch sensor 150 are contact input devices and devices configured to receive mechanical input such as contact with and press by the user's fingers or the like. The display 160 and the flash device 170 are devices configured to generate physical output, which is light. When the physical input/output units as described above operate in the electronic device 10 having implemented thereon the EVS 110, as described below, there is a possibility that the operations affect the detection results of the EVS 110.

First, the vibrator 120 generates vibration to the housing of the electronic device 10, and hence the EVS 110 also vibrates when the vibrator 120 operates. The EVS 110 detects intensity changes in incident light as described above, and when the EVS 110 itself vibrates, the intensity of light at each pixel changes due to changes in the positional relation with an object, and an event signal is generated at each of the pixels even if no luminance change occurs on the object surface. The same holds true for the speaker 130, and with the vibration generated to the housing when the speaker 130 outputs sound, an event signal is generated at each of the pixels of the EVS 110. Such an event signal acts as noise in a case where the movement of an object relative to the electronic device 10 is detected with use of the EVS 110, for example. Since the temporal resolution of the EVS 110 is high compared to that of frame-based vision sensors, for example, there is a possibility that such vibration of the housing affects detection results to a non-negligible extent.

Next, when the operation button 140 and the touch sensor 150 receive input such as contact with and press by the user's fingers or the like, the displacement or vibration of the housing of the electronic device 10 occurs. Similar to the example described above, when the displacement or vibration of the EVS 110 itself occurs, an event signal is generated at each of the pixels even if no luminance change occurs on an object surface.

Further, the display 160 and the flash device 170 affect the detection results of the EVS 110, with generated light reflected by an object. In this case, although luminance changes occur on the object surface, in a case where the movement of the object relative to the electronic device 10 is detected with use of the EVS 110, for example, the event signal generated by the reflection of light from the display 160 or the flash device 170 acts as noise as in the case described above.

Here, the electronic device 10 may include an IMU (Inertial Measurement Unit). The IMU detects motion occurring to the housing of the electronic device 10 and may thus be treated as a physical input/output unit. Alternatively, the IMU may be used as means for detecting that the physical input/output units as exemplified above, specifically, for example, the vibrator 120, the speaker 130, the operation button 140, or the touch sensor 150, are operating.

To address the effect of the operation of the physical input/output units on the detection results of the EVS 110 as described above, the control unit 200 sets a predetermined flag to the event signal generated by the EVS 110 during the operation of the physical input/output units as described below. The predetermined flag is added as optional setting information to the event signal, for example. With the predetermined flag, the event signal stored in the memory 210 or transferred to the external device 20 through the communication device 230 can be distinguished between the event signal generated during the operation of the physical input/output units and the event signal other than that. Now, examples of processing by the control unit 200 in the individual examples are described.

Figure 2:
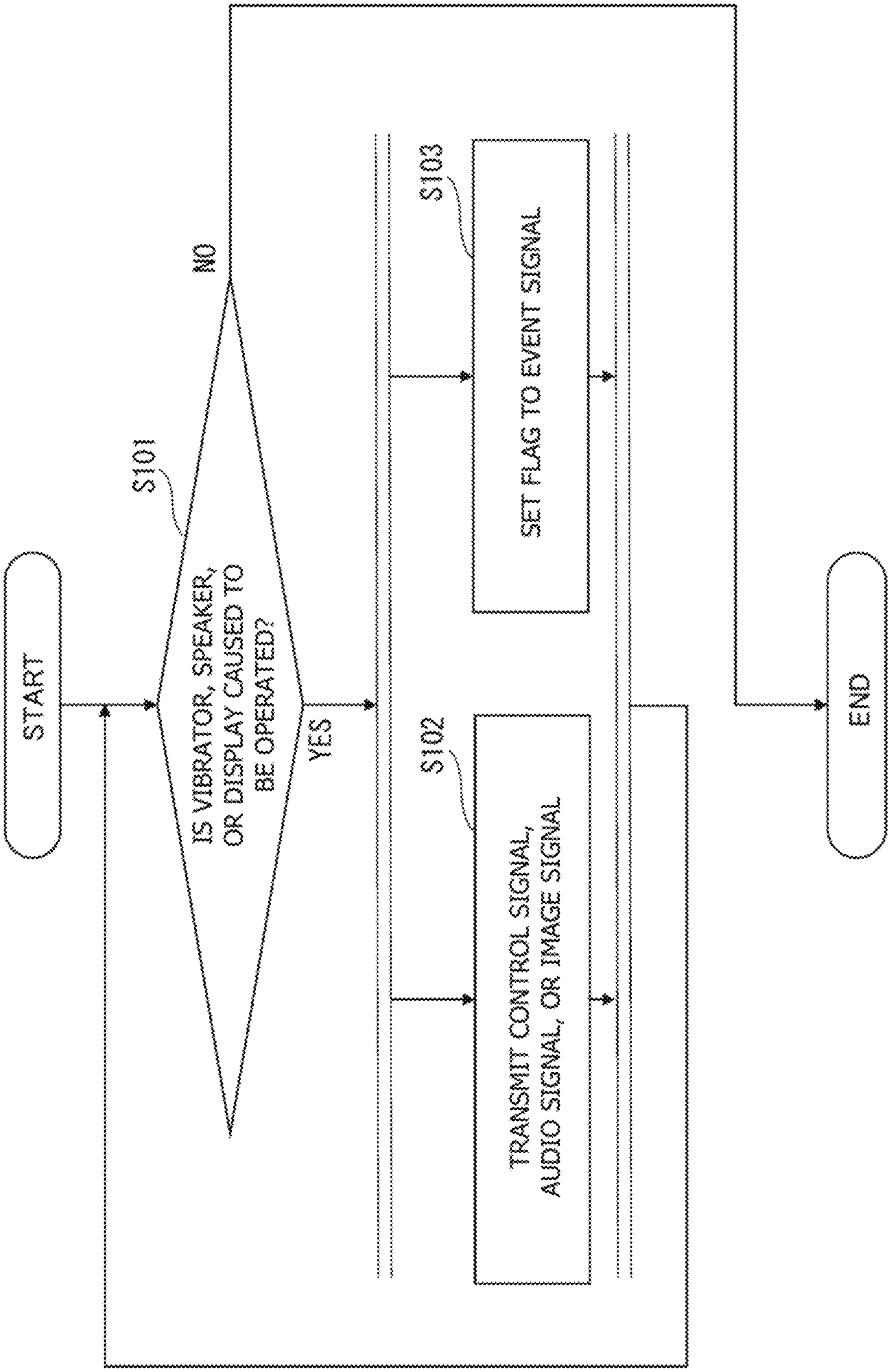
FIG. 2 is a flowchart illustrating an example of processing in a case where a vibrator, a speaker, or a display operates.

FIG. 2 is a flowchart illustrating an example of processing in a case where the vibrator 120, the speaker 130, or the display 160 operates. In the example illustrated in FIG. 2, the vibrator 120, the speaker 130, and the display 160 operate under the control of the control unit 200, and hence the control unit 200 can substantially synchronize the operation of these components with the processing of setting the flag to an event signal from the EVS 110. Specifically, in a case where it is determined to operate the vibrator 120, the speaker 130, or the display 160 (YES in Step S101), the control unit 200 substantially simultaneously executes the transmission of a control signal to the vibrator 120, an audio signal to the speaker 130, or an image signal to the display 160 (Step S102), and the setting of the flag to an event signal (Step S103). Step S101 to Step S103 described above are executed repeatedly, and while the vibrator 120, the speaker 130, or the display 160 continues to operate, the setting of the flag to an event signal continues.

Figure 3:
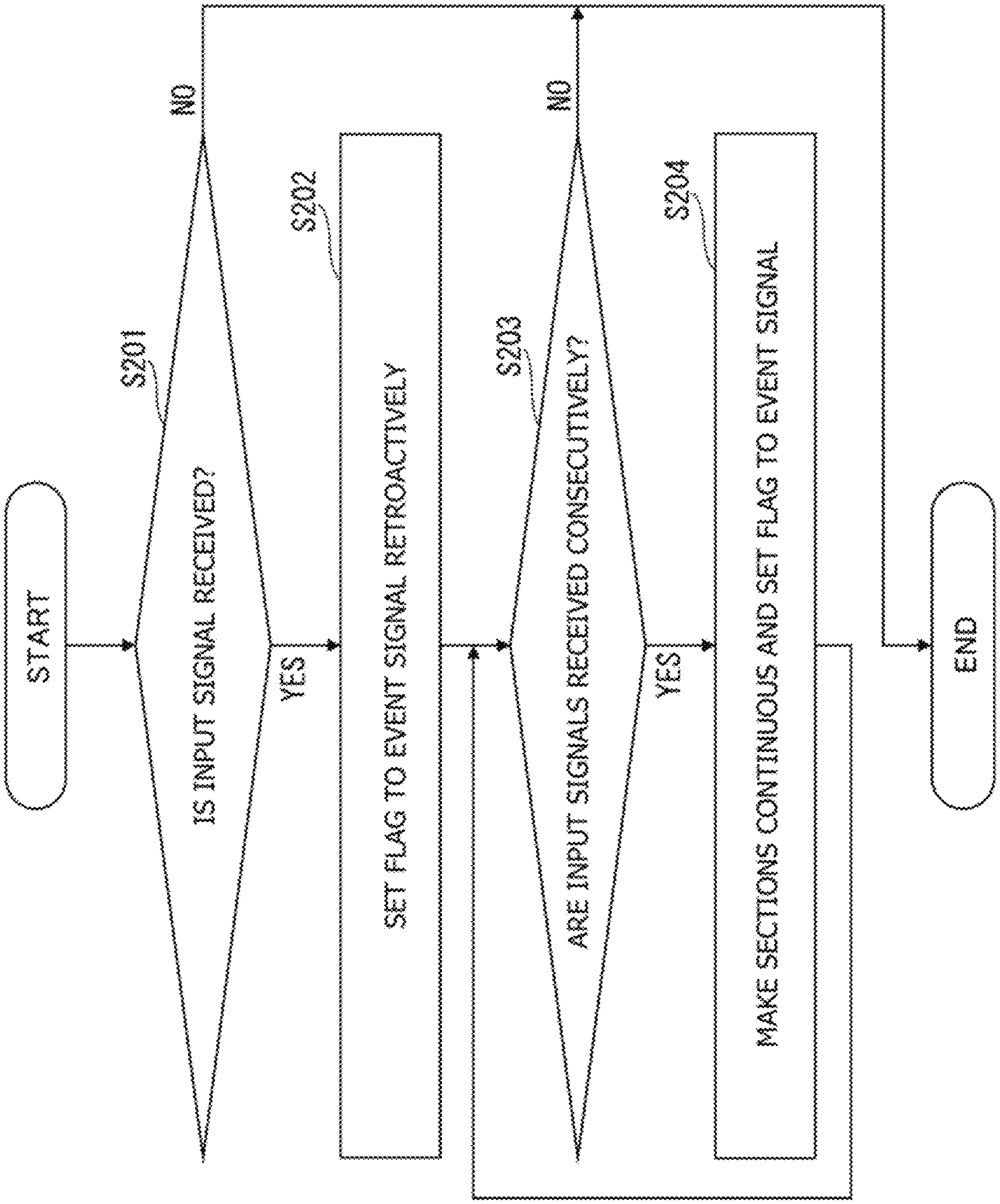
FIG. 3 is a flowchart illustrating an example of processing in a case where an operation button or a touch sensor receives physical input.

FIG. 3 is a flowchart illustrating an example of processing in a case where the operation button 140 or the touch sensor 150 receives physical input. In the example illustrated in FIG. 3, the fact that the operation button 140 or the touch sensor 150 has received input is detected by the control unit 200 retroactively, and hence the control unit 200 sets the flag to an event signal retroactively to the time when the input has been received. Specifically, when the control unit 200 receives an input signal from the operation button 140 or the touch sensor 150 (YES in Step S201), the control unit 200 refers to the timestamp of the event signal buffered in the memory 210 to trace back in time and sets the flag to the event signal in the section of a predetermined length before and after the time point at which the input signal has been received (Step S202). In a case where input signals are received consecutively with a time difference shorter than a predetermined threshold (YES in Step S203), the control unit 200 may make the section in which the flag has already been set and the section in which the flag is to be newly set continuous (Step S204). In a case where the operation button 140 or the touch sensor 150 receives input consecutively, the possibility of the consecutive displacement or vibration of the housing of the electronic device 10 is high, and hence the flag can be set to an event signal continuously until a series of inputs ends through the processing in Step S203 and Step S204 described above.

Figure 4:
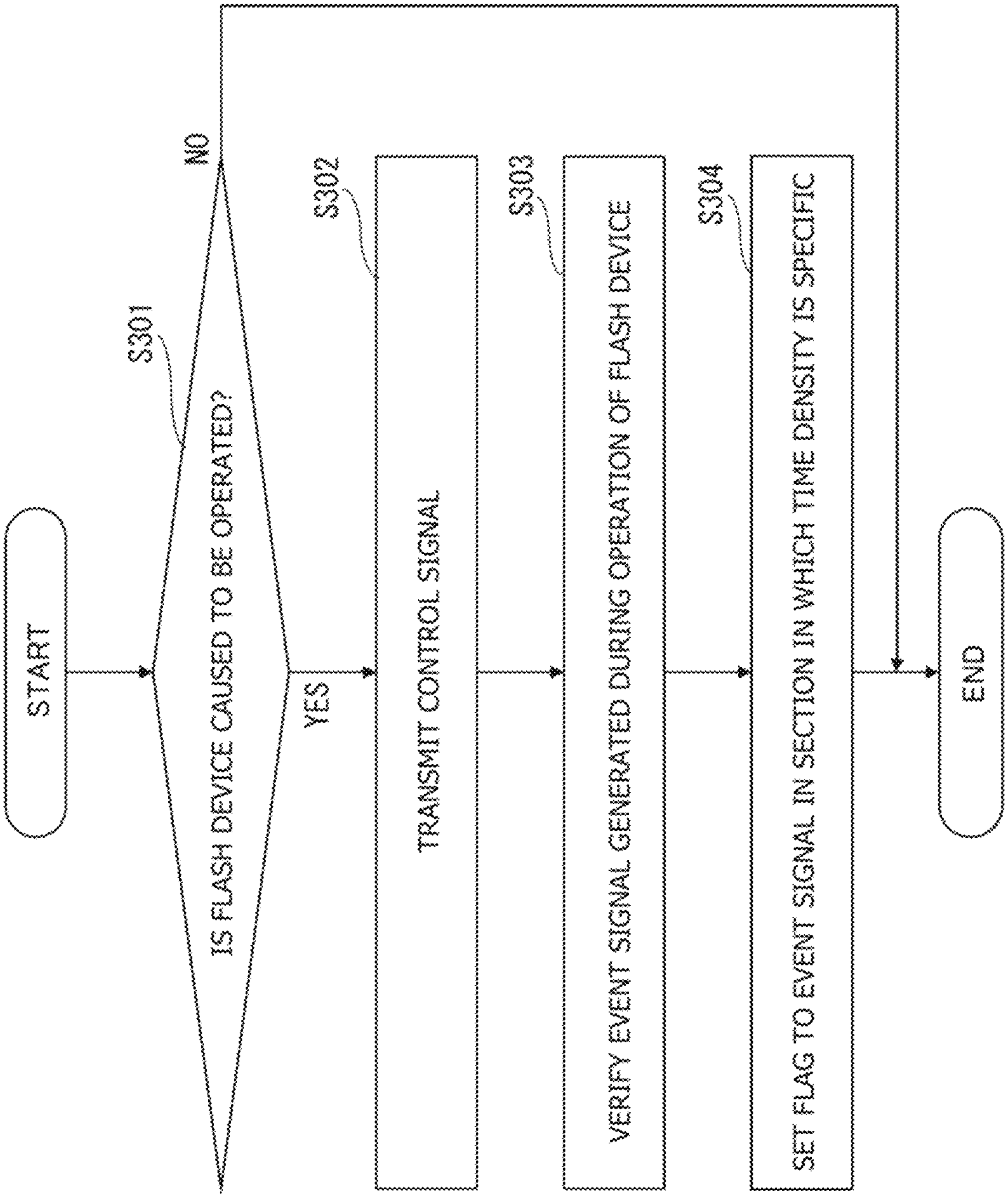
FIG. 4 is a flowchart illustrating an example of processing in a case where a flash device operates.

FIG. 4 is a flowchart illustrating an example of processing in a case where the flash device 170 operates. The flash device 170 also operates under the control of the control unit 200, and hence the control unit 200 may substantially synchronize the operation of the flash device 170 with the processing of setting the flag to an event signal from the EVS 110 as in the example of FIG. 2 described above. In contrast to this, in the example illustrated in FIG. 4, the operation of the flash device 170 is executed momentarily, and hence different processing from the example of FIG. 2 is executed. Specifically, in a case where it is determined to operate the flash device 170 (YES in Step S301), the control unit 200 transmits a control signal to the flash device 170 (Step S302), verifies the event signal generated during the operation of the flash device 170 and buffered in the memory 210 (Step S303), and sets the flag to the event signal in the sections in which the time density of the event signal is specific (Step S304). Through such processing, it is possible to more reliably identify the sections affected by the operation of the flash device 170, that is, the sections in which a specifically large number of event signals are generated compared to the sections before and after the section in question, and to set the flag to the event signal.

With the configuration of one embodiment of the present invention as described above, in a case where the EVS 110 is implemented together with other devices, specifically, the vibrator 120, the speaker 130, the operation button 140, the touch sensor 150, the display 160, the flash device 170, and the like, which are physical input/output units, in the electronic device 10, it is possible to reduce the effect of the operating physical input/output units on the detection results of the EVS 110, and to achieve an effective operation with a reduced noise included in detection results, for example.

Specifically, when generated event signals are utilized in the electronic device 10 or the external device 20, the event signal having the flag set thereto may be treated as having low reliability. For example, the event signal having the flag set thereto may be ignored. Alternatively, the event signal having the flag set thereto may be ignored in a case where the event signal in question indicates a different detection result from the event signal having no flag set thereto. Further, in a case where an event signal is affected by continuously operating devices such as the speaker 130 or the display 160, the event signal may be corrected through predetermined procedures to be utilized.

While the embodiment of the present invention has been described in detail above with reference to the accompanying drawings, the present invention is not limited to such an example. It is apparent that various changes or modifications could be arrived at by persons who have ordinary knowledge in the technical field to which the present invention belongs within the scope of the technical idea described in the appended claims, and it is understood that such changes and modifications naturally belong to the technical scope of the present invention.

REFERENCE SIGNS LIST

10: Electronic device
120: Vibrator
130: Speaker
140: Operation button
150: Touch sensor
160: Display
170: Flash device
200: Control unit
210: Memory
220: Recording medium
230: Communication device
20: External device

The invention claimed is:

1. An electronic device comprising:
an event-based vision sensor;
a physical input/output unit; and
processing circuitry configured to simultaneously execute transmitting a control signal to operate the physical input/output unit and setting a predetermined flag to an event signal generated by the event-based vision sensor during operation of the physical input/output unit.

2. The electronic device according to claim 1, wherein the input/output unit includes a device configured to generate vibration.

3. The electronic device according to claim 2, wherein the device configured to generate vibration includes a vibrator.

4. The electronic device according to claim 2, wherein the device configured to generate vibration includes a speaker.

5. The electronic device according to claim 2, wherein the processing circuitry is configured to substantially simultaneously execute a transmission of a control signal to operate the device configured to generate vibration and the setting of the predetermined flag to the event signal.

6. The electronic device according to claim 1, wherein the physical input/output unit includes a contact input device.

7. The electronic device according to claim 6, wherein the contact input device includes an operation button.

8. The electronic device according to claim 6, wherein the contact input device includes a touch sensor.

9. The electronic device according to claim 6, wherein the processing circuitry is configured to:
detect the operation of the contact input device; and
retroactively set the predetermined flag to the event signal when the operation of the contact input device is detected.

10. The electronic device according to claim 1, wherein the physical input/output unit includes a device configured to generate light.

11. The electronic device according to claim 10, wherein the device configured to generate light includes a display.

12. The electronic device according to claim 10, wherein the device configured to generate light includes a flash device.

13. The electronic device according to claim 10, wherein the processing circuitry is configured to:
transmit a control signal to the device configured to generate light;
verify the event signal generated during the operation of the device configured to generate light, and
set the predetermined flag to the event signal based upon a time density of the event signal.

14. The electronic device according to claim 1, wherein the control unit transfers the event signal to an external device.

15. The electronic device according to claim 1, wherein the processing circuitry is configured to:
detect the operation of the physical input/output unit; and retroactively set the predetermined flag to the event signal when the operation of the physical input/output unit is detected.

16. The electronic device according to claim 1, wherein the processing circuitry is configured to:

transmit a control signal to the physical input/output unit;

verify the event signal generated during the operation of the physical input/output unit, and set the predetermined flag to the event signal based upon a time density of the event signal.

17. The electronic device according to claim 1, wherein the processing circuitry is configured to ignore the event signal having the predetermined flag set thereto.

18. A control method for an electronic device including an event-based vision sensor and a physical input/output unit, the control method comprising:

simultaneously executing:

transmitting a control signal to operate the physical input/output unit; and setting a predetermined flag to an event signal generated by the event-based vision sensor during operation of the physical input/output unit.

19. The control method according to claim 18, further comprising:

detecting the operation of the physical input/output unit; and retroactively setting the predetermined flag to the event signal when the operation of the physical input/output unit is detected.

20. A non-transitory computer readable medium storing a control program for causing an electronic device including an event-based vision sensor and a physical input/output unit to perform a method, the method comprising:

simultaneously executing:

transmitting a control signal to operate the physical input/output unit; and setting a predetermined flag to an event signal generated by the event-based vision sensor during operation of the physical input/output unit.

* * * * *